United States Patent
Shindo et al.

(10) Patent No.: US 12,429,110 B2
(45) Date of Patent: Sep. 30, 2025

(54) FRICTION TRANSMISSION BELT

(71) Applicant: BANDO CHEMICAL INDUSTRIES, LTD., Kobe (JP)

(72) Inventors: Yuya Shindo, Kobe (JP); Shogo Kobayashi, Kobe (JP); Kazuaki Matsuda, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 192 days.

(21) Appl. No.: 17/580,736

(22) Filed: Jan. 21, 2022

(65) Prior Publication Data

US 2022/0243786 A1    Aug. 4, 2022

(30) Foreign Application Priority Data

Jan. 29, 2021  (JP) .................. 2021-013331

(51) Int. Cl.
  *F16G 1/06*   (2006.01)
  *B29D 29/08*  (2006.01)
  (Continued)

(52) U.S. Cl.
  CPC .............. *F16G 1/06* (2013.01); *F16G 1/08* (2013.01); *F16G 1/10* (2013.01); *F16G 1/28* (2013.01);
  (Continued)

(58) Field of Classification Search
  CPC ..... F16G 5/00; F16G 5/04; F16G 5/06; F16G 5/08; F16G 5/20; F16G 1/00; F16G 1/06;
  (Continued)

(56) References Cited

U.S. PATENT DOCUMENTS 3,853,017 A * 12/1974 White, Jr. ................. F16G 1/08
                                                                474/271
3,981,206 A *  9/1976 Miranti, Jr. ............... F16G 5/20
                                                                474/271
(Continued)

FOREIGN PATENT DOCUMENTS

DE   10 2006 048755 A1   4/2008
JP      H02-042344 B2    9/1990
(Continued)

OTHER PUBLICATIONS

Milligan et al; FFA4/GPR120: Pharmacology and Therapeutic Opportunities; Sep. 2017; Trends in Pharmacological Sciences, vol. 38, Issue No. 9; p. 810; https://www.sciencedirect.com/science/article/pii/S016561471730127X?ref=pdf_download&fr=RR-2&rr=8b12bf67cfeb0cd5 (Year: 2017).*
(Continued)

*Primary Examiner* — Anna M Momper
*Assistant Examiner* — Raveen J Dias
(74) *Attorney, Agent, or Firm* — Faegre Drinker Biddle & Reath LLP

(57) ABSTRACT

A friction transmission belt includes a compression layer forming a pulley contact portion, the compression layer includes an inner layer formed from a rubber composition and an outer layer provided on a pulley contact side of the inner layer and formed from a fiber member, and a ratio (M10 modulus/M50 modulus) of an modulus at 10% elongation in a belt longitudinal direction (M10 modulus) to an modulus at 50% elongation in the belt longitudinal direction (M50 modulus), of the rubber composition, is not less than 1.5.

4 Claims, 6 Drawing Sheets

(51) Int. Cl.
| | |
|---|---|
| *B29D 29/10* | (2006.01) |
| *F16G 1/08* | (2006.01) |
| *F16G 1/10* | (2006.01) |
| *F16G 1/28* | (2006.01) |
| *F16G 5/04* | (2006.01) |
| *F16G 5/06* | (2006.01) |
| *F16G 5/08* | (2006.01) |
| *F16G 5/20* | (2006.01) |

(52) U.S. Cl.
CPC ............... *F16G 5/04* (2013.01); *F16G 5/06* (2013.01); *F16G 5/08* (2013.01); *F16G 5/20* (2013.01); *B29D 29/08* (2013.01); *B29D 29/10* (2013.01); *B29D 29/103* (2013.01)

(58) Field of Classification Search
CPC ..... F16G 1/08; F16G 1/10; F16G 1/28; B29D 29/00; B29D 29/08; B29D 29/10; B29D 29/103; B29D 29/106
See application file for complete search history.

(56) References Cited

U.S. PATENT DOCUMENTS

| | | | | | |
|---|---|---|---|---|---|
| 4,027,545 | A * | 6/1977 | White, Jr. | ............... | B29D 29/10 474/263 |
| 4,305,713 | A * | 12/1981 | Imamura | ................ | F16G 5/166 474/238 |
| 4,432,744 | A * | 2/1984 | Imamura | ............ | D03D 1/0094 474/267 |
| 4,747,812 | A * | 5/1988 | Matsuoka | ............ | B29D 29/103 156/138 |
| 4,891,040 | A * | 1/1990 | Nagai | ................... | D02G 3/447 474/267 |
| 4,892,510 | A * | 1/1990 | Matsuoka | ............ | F16G 5/20 474/263 |
| 5,624,515 | A * | 4/1997 | Onoe | ......................... | C08J 5/06 156/137 |
| 5,860,883 | A * | 1/1999 | Jonen | ........................ | F16G 5/20 474/271 |
| 6,432,013 | B1 * | 8/2002 | Tani | .......................... | F16G 5/20 474/263 |
| 6,435,997 | B1 * | 8/2002 | Kurose | ..................... | F16G 5/20 474/263 |
| 6,482,118 | B1 * | 11/2002 | Watanabe | .................. | F16G 5/20 474/263 |
| 6,491,598 | B1 * | 12/2002 | Rosenboom | ............ | B32B 25/10 474/263 |
| 6,669,592 | B2 * | 12/2003 | Hayashi | .................... | F16G 5/00 474/260 |
| 6,695,734 | B2 * | 2/2004 | Hedberg | ................... | F16G 5/06 474/263 |
| 6,918,849 | B2 * | 7/2005 | Gregg | ....................... | F16G 1/08 156/137 |
| 7,056,250 | B2 * | 6/2006 | Burrowes | ................. | C08L 21/00 474/263 |
| 9,341,234 | B2 * | 5/2016 | Shiriike | ..................... | F16G 5/06 |
| 9,822,842 | B2 * | 11/2017 | Yoshida | .................... | F16G 5/20 |
| 9,927,002 | B2 * | 3/2018 | Kim | ........................... | F16G 1/12 |
| 10,274,045 | B2 * | 4/2019 | Okubo | ...................... | F16G 5/08 |
| 10,323,717 | B2 * | 6/2019 | Okubo | ....................... | C08L 67/02 |
| 10,343,358 | B2 * | 7/2019 | Harushige | ................ | B32B 25/08 |
| 10,538,044 | B2 * | 1/2020 | Hata | .......................... | B29C 35/02 |
| 10,767,727 | B2 * | 9/2020 | Yoshida | .................... | C08J 5/005 |
| 10,968,979 | B2 * | 4/2021 | Shindo | ..................... | D03D 1/00 |
| 11,674,561 | B2 * | 6/2023 | Ishiguro | .................... | C09J 7/24 474/263 |
| 2002/0128105 | A1 * | 9/2002 | Hedberg | ................... | F16G 5/06 474/260 |
| 2003/0050143 | A1 * | 3/2003 | Gregg | ........................ | F16G 1/08 474/263 |
| 2003/0078125 | A1 * | 4/2003 | Knutson | ................... | F16G 1/28 474/263 |
| 2004/0204275 | A1 * | 10/2004 | Burrowes | ................ | C08L 21/00 474/263 |
| 2005/0245339 | A1 * | 11/2005 | Ollenborger | ............. | F16G 5/20 474/263 |
| 2007/0244263 | A1 * | 10/2007 | Burrowes | ................ | F16G 5/166 474/271 |
| 2008/0207371 | A1 | 8/2008 | Dieudonne et al. | | |
| 2009/0291796 | A1 * | 11/2009 | Mitsutomi | ............. | F16G 5/166 474/252 |
| 2010/0167860 | A1 * | 7/2010 | Mori | ...................... | D03D 15/49 474/252 |
| 2010/0240482 | A1 * | 9/2010 | Kanzow | ................... | F16G 5/08 474/237 |
| 2010/0298079 | A1 * | 11/2010 | Shiriike | .................... | F16G 5/20 474/237 |
| 2011/0269588 | A1 * | 11/2011 | Fleck | ........................ | F16G 1/10 474/260 |
| 2012/0058849 | A1 * | 3/2012 | Yoshida | ............... | B29D 29/103 474/263 |
| 2012/0295748 | A1 * | 11/2012 | Shiriike | .................... | F16G 5/20 474/264 |
| 2013/0040771 | A1 * | 2/2013 | Well | .......................... | F16G 1/28 474/205 |
| 2014/0296010 | A1 * | 10/2014 | Yoshida | ................. | B29D 29/00 474/190 |
| 2014/0296011 | A1 * | 10/2014 | Yoshida | ................. | F16G 5/08 264/172.19 |
| 2014/0364260 | A1 * | 12/2014 | Takahashi | ................ | C08K 7/02 474/263 |
| 2015/0148165 | A1 * | 5/2015 | Matsuda | ................. | F16G 1/21 474/264 |
| 2015/0152590 | A1 * | 6/2015 | Knox | ......................... | C08K 9/04 524/556 |
| 2015/0219185 | A1 * | 8/2015 | Matsuda | ................. | F16G 5/08 474/237 |
| 2016/0010722 | A1 * | 1/2016 | Kim | ........................... | F16G 1/10 474/271 |
| 2016/0053851 | A1 * | 2/2016 | Kojima | ..................... | F16G 5/08 474/265 |
| 2016/0208888 | A1 * | 7/2016 | Nonaka | ..................... | F16G 1/08 |
| 2016/0208890 | A1 | 7/2016 | Nonaka et al. | | |
| 2017/0009847 | A1 * | 1/2017 | Mitsutomi | ............. | D04B 21/20 |
| 2017/0023098 | A1 * | 1/2017 | Burlett | ....................... | F16G 5/20 |
| 2017/0284504 | A1 * | 10/2017 | Mitsutomi | ................ | F16G 5/08 |
| 2018/0223953 | A1 * | 8/2018 | Harada | ..................... | B32B 3/30 |
| 2018/0283495 | A1 * | 10/2018 | Okubo | ...................... | F16G 1/10 |
| 2018/0326680 | A1 * | 11/2018 | Okubo | ................. | B29D 29/103 |
| 2018/0370168 | A1 * | 12/2018 | Harushige | ............. | B29D 29/10 |
| 2018/0372183 | A1 * | 12/2018 | Okubo | ....................... | F16G 5/06 |
| 2019/0022963 | A1 * | 1/2019 | Harushige | ............. | B29D 29/10 |
| 2019/0030761 | A1 * | 1/2019 | Miyanishi | ............. | B29D 29/10 |
| 2019/0030844 | A1 * | 1/2019 | Harushige | ................ | B29C 35/02 |
| 2019/0030845 | A1 * | 1/2019 | Hata | .......................... | F16G 5/06 |
| 2019/0128372 | A1 * | 5/2019 | Ishiguro | .................... | B32B 3/263 |
| 2019/0177889 | A1 * | 6/2019 | Gao | ........................... | F16G 5/20 |
| 2019/0390047 | A1 * | 12/2019 | Ozaki | ........................ | F16G 5/08 |
| 2020/0173523 | A1 * | 6/2020 | Hamamoto | ................ | B32B 25/18 |
| 2020/0232539 | A1 * | 7/2020 | Shindo | ...................... | F16G 5/20 |
| 2021/0003194 | A1 * | 1/2021 | Takechi | .................... | F16G 5/20 |
| 2021/0324938 | A1 * | 10/2021 | Hamamoto | ............. | C08G 18/42 |
| 2022/0056983 | A1 * | 2/2022 | Hamamoto | ............. | D06M 23/18 |
| 2022/0145962 | A1 * | 5/2022 | Mitsutomi | ................ | F16G 5/20 |
| 2022/0282769 | A1 * | 9/2022 | Kobayashi | ............... | C08L 1/02 |
| 2022/0316554 | A1 * | 10/2022 | Kobayashi | ............... | F16G 5/08 |
| 2022/0325777 | A1 * | 10/2022 | Esaka | ........................ | F16G 5/20 |
| 2022/0349455 | A1 * | 11/2022 | Shindo | ..................... | B32B 25/10 |
| 2023/0099380 | A1 * | 3/2023 | Gerring | ................. | D04B 21/20 474/237 |

FOREIGN PATENT DOCUMENTS

| | | |
|---|---|---|
| JP | 2002-005238 A | 1/2002 |
| JP | 2002-122187 A | 4/2002 |
| WO | WO 2009/110150 A1 | 9/2009 |
| WO | WO-2015/045255 A1 | 4/2015 |

(56) References Cited

FOREIGN PATENT DOCUMENTS

OTHER PUBLICATIONS

Extended European search report issued in European patent application No. 22 153 729.3, dated Apr. 4, 2023.

* cited by examiner

FRICTION TRANSMISSION BELT

TECHNICAL FIELD

The present invention relates to a friction transmission belt.

This application claims priority on Japanese Patent Application No. 2021-013331 filed on Jan. 29, 2021, the entire content of which is incorporated herein by reference.

BACKGROUND ART

Conventionally, as a means for transmitting rotational power of an engine, a motor, or the like, a method in which pulleys or the like are fixedly provided on rotation shafts on a driving side and a driven side and a transmission belt such as a V-ribbed belt and a V-belt is trained around each pulley, has been widely used.

When such a transmission belt is trained around pulleys for use, for example, the surfaces of V-shaped ribs are covered with a reinforcing fabric in the V-ribbed belt in order to maintain the pulley contact portion of the belt with a low friction coefficient and improve wear durability (see, for example, PATENT LITERATURES 1 to 3).

CITATION LIST

Patent Literature

PATENT LITERATURE 1: Japanese Examined Patent Publication No. H2-42344
PATENT LITERATURE 2: Japanese Laid-Open Patent Publication No. 2002-122187
PATENT LITERATURE 3: Japanese Laid-Open Patent Publication No. 2002-5238

SUMMARY OF THE INVENTION

Technical Problem

Improving wear durability in friction transmission belts is a characteristic usually required, and this requirement is not eliminated.

For the V-ribbed belts described in PATENT LITERATURES 1 to 3, wear durability is improved by devising the configuration of the reinforcing fabric and its surroundings.

Solution to Problem

The present inventors have conducted an intensive study to improve the wear durability of a friction transmission belt, have found a friction transmission belt having excellent wear durability on the basis of a new idea different from those of PATENT LITERATURES 1 to 3, and have completed the present invention.

A friction transmission belt according to the present invention is a friction transmission belt including a compression layer forming a pulley contact portion, wherein
the compression layer includes an inner layer formed from a rubber composition and an outer layer provided on a pulley contact side of the inner layer and formed from a fiber member, and
a ratio (hereinafter, also referred to as M10 modulus/M50 modulus) of an modulus at 10% elongation in a belt longitudinal direction (hereinafter, also referred to as M10 modulus) to an modulus at 50% elongation in the belt longitudinal direction (hereinafter, also referred to as M50 modulus), of the rubber composition, is not less than 1.5.

In the friction transmission belt, the ratio (M10 modulus/M50 modulus) of the M10 modulus to the M50 modulus, of the rubber composition forming the inner layer of the compression layer, is as large as 1.5 or greater, so that the friction transmission belt has excellent wear durability.

In the friction transmission belt, the ratio (M10 modulus/M50 modulus) of the rubber composition is more preferably not less than 2.0.

In this case, the friction transmission belt has excellent wear durability and also has excellent crack durability.

In the friction transmission belt, a stress at 50% elongation (M50) in the belt longitudinal direction (hereinafter, also referred to as M50 in the longitudinal direction) of the rubber composition is preferably not greater than 10 MPa and more preferably not greater than 7 MPa.

This case is particularly suitable for achieving both good wear durability and good crack durability.

The friction transmission belt is preferably a V-ribbed belt.

The rib bottom of the V-ribbed belt including the above-described compression layer is less likely to come into contact with a pulley and be worn when the V-ribbed belt meshes with the pulley, so that the V-ribbed belt exhibits good wear durability.

Advantageous Effects of the Invention

The friction transmission belt according to the present invention has excellent wear durability.

DETAILED DESCRIPTION

Hereinafter, an embodiment of the present invention will be described with reference to the drawings.
(V-Ribbed Belt)

Figure 1:
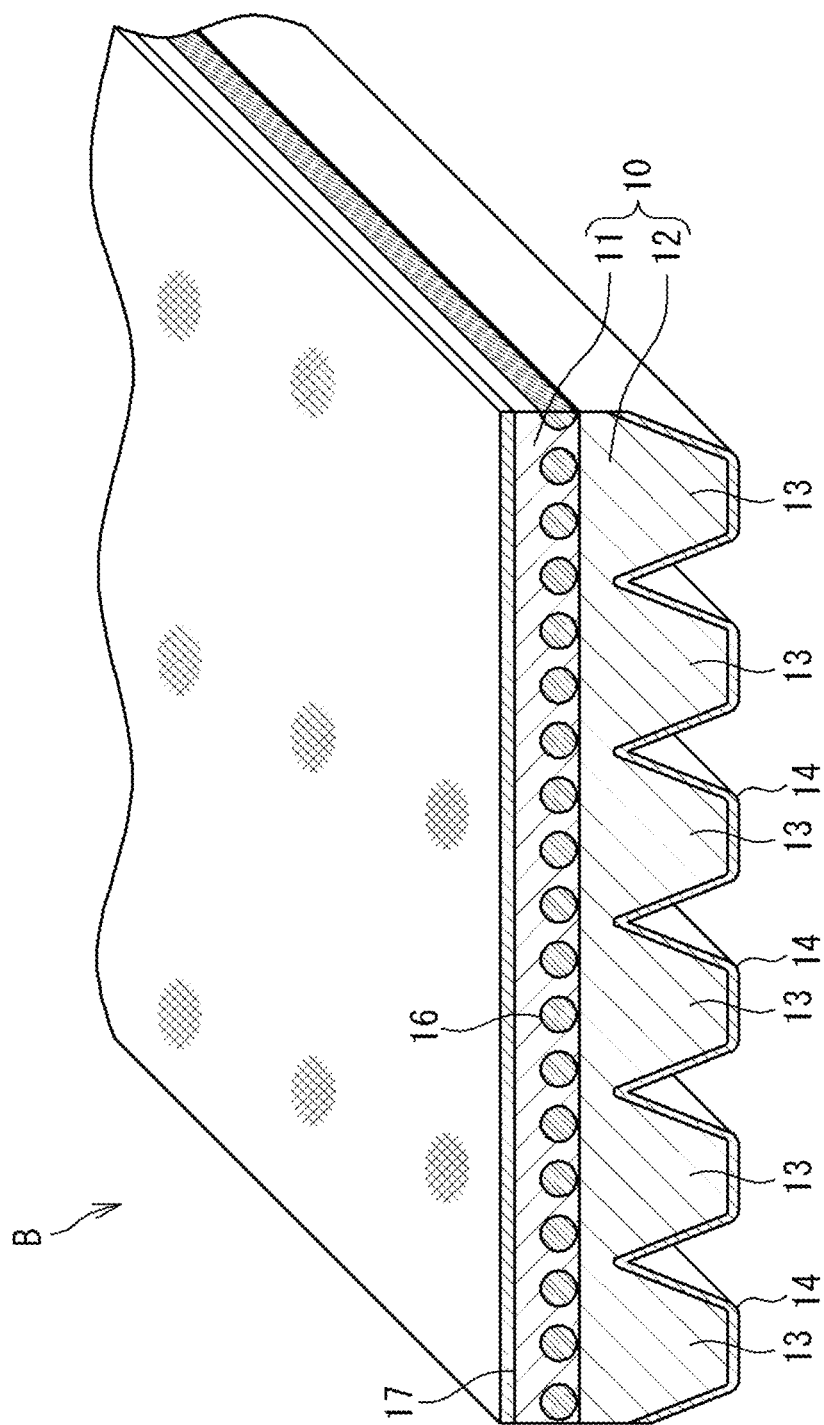
FIG. 1 is a diagram schematically showing a part of a V-ribbed belt according to one embodiment of the present invention.
Figure 2A:
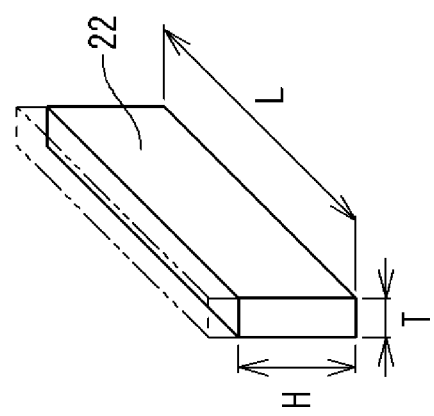
FIG. 2(a) to FIG. 2(e) illustrate methods for evaluating the characteristics of a rubber composition forming a compression rubber layer of the V-ribbed belt.
Figure 2B:
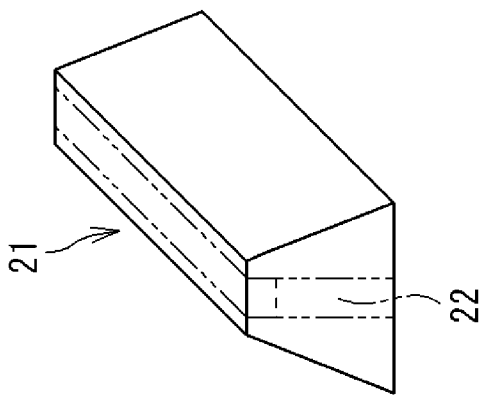
Figure 2C:
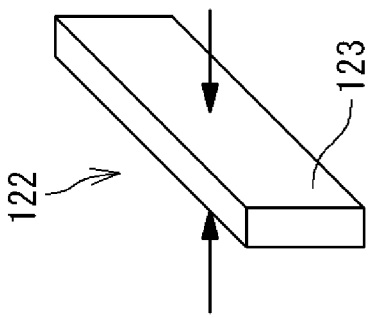
Figure 2D:
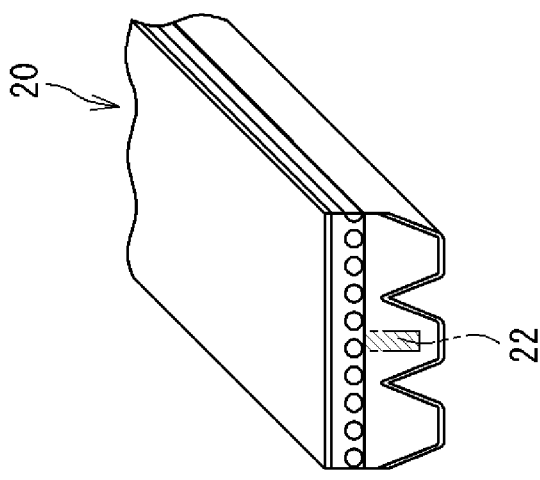
Figure 2E:
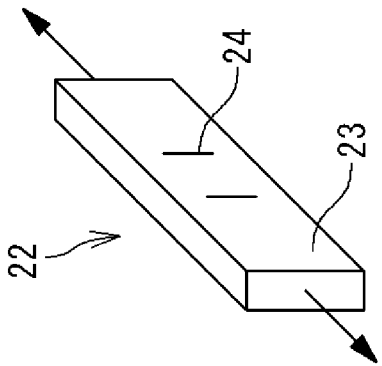

FIG. 1 is a diagram schematically showing a part of a V-ribbed belt B according to one embodiment of the present invention.

The V-ribbed belt B is used, for example, for an auxiliary driving belt transmission device provided in an automotive engine compartment. The V-ribbed belt B is formed to have a belt circumference of 700 to 3,000 mm, a belt width of 10 to 36 mm, and a belt thickness of 3.5 to 5.0 mm.

The V-ribbed belt B has a double-layered belt body 10 including an adhesive rubber layer 11 on the belt outer circumferential side and a compression rubber layer 12 on the belt inner circumferential side. A backface rubber layer 17 is attached to the surface on the belt outer circumferential side of the belt body 10. A rib-side reinforcing fabric 14 which is made of a knitted fabric (knit) and which is a fiber member is provided on the surface on the rib side of the belt body 10. In addition, a core wire 16 is embedded in the adhesive rubber layer 11 so as to form a helical pattern having a pitch in the belt width direction.

In the V-ribbed belt B, the compression rubber layer 12 and the rib-side reinforcing fabric 14, which is provided outward of the compression rubber layer 12, form a compression layer of a friction transmission belt, and the compression layer forms a pulley contact portion on the belt inner circumferential side.

Each component will be described below.

The adhesive rubber layer 11 is formed in a belt shape having a horizontally long rectangular cross section, and has, for example, a thickness of 0.8 to 2.5 mm. The adhesive rubber layer 11 is formed by using an uncrosslinked rubber composition in which various compounding ingredients are blended in a raw material rubber component.

As the raw material rubber component of the rubber composition forming the adhesive rubber layer 11, for example, an ethylene-α-olefin elastomer, such as ethylene propylene rubber (EPR) and ethylene-propylene-diene monomer rubber (EPDM), chloroprene rubber (CR), chlorosulfonated polyethylene rubber (CSM), hydrogenated acrylonitrile rubber (HNBR), or the like is used. Among these rubbers, an ethylene-α-olefin elastomer is preferable from the viewpoint of exhibiting excellent properties in terms of heat resistance and cold resistance.

Examples of compounding ingredients used for the adhesive rubber layer 11 include a crosslinking agent such as sulfur and an organic peroxide, a vulcanization accelerator, a co-crosslinking agent, an antioxidant, a processing aid, a plasticizer, a reinforcing material such as carbon black, and a filler. The rubber composition forming the adhesive rubber layer 11 may contain short fibers. However, from the viewpoint of adhesiveness to the core wire 16, preferably, the rubber composition forming the adhesive rubber layer 11 does not contain short fibers. The rubber composition forming the adhesive rubber layer 11 is obtained by blending the compounding ingredients into the raw material rubber component and heating and pressurizing a kneaded uncrosslinked rubber composition to crosslink the rubber composition with a crosslinking agent.

The core wire 16 is embedded in the adhesive rubber layer 11 so as to extend in the belt longitudinal direction and form a helical pattern having a pitch in the belt width direction. The core wire 16 is formed from a twisted yarn 16' made of polyester fibers, polyethylene naphthalate (PEN) fibers, aramid fibers, vinylon fibers, polyketone fibers, or the like. The core wire 16 has, for example, an outer diameter of 0.7 to 1.1 mm. In order to provide an adhesive property with respect to the belt body 10, the core wire 16 is subjected to an adhesion treatment of immersing the core wire 16 in an RFL aqueous solution and then heating the core wire 16 and/or an adhesion treatment of immersing the core wire 16 in rubber cement and then drying the core wire 16 before molding processing.

The compression rubber layer 12 is provided with a plurality of V-shaped ribs 13 protruding on the belt inner circumferential side. These V-shaped ribs 13 are each formed in a projection shape having a substantially triangular cross-section, and extending in the belt longitudinal direction, and are aligned in the belt width direction. Each V-shaped rib 13 has, for example, a rib height of 2.0 to 3.0 mm, and the width between the base ends thereof is, for example, 1.0 to 3.6 mm. In addition, the number of ribs is, for example, three to ten (six in FIG. 1).

The compression rubber layer 12 is formed from a rubber composition having predetermined tensile characteristics. Therefore, both good wear durability and good crack durability can be achieved.

Specifically, the ratio (M10 modulus/M50 modulus) of an M10 modulus in the longitudinal direction of the V-ribbed belt B to an M50 modulus in the longitudinal direction, of the rubber composition forming the compression rubber layer 12, is not less than 1.5. Accordingly, the V-ribbed belt B has good wear durability.

M10 modulus/M50 modulus described above is preferably not less than 2.0. Accordingly, good wear durability can be ensured without impairing the crack durability of the V-ribbed belt B. To merely improve the wear durability of the V-ribbed belt B, such an effect can be expected by increasing the hardness of the rubber composition. However, if the hardness of the rubber composition is increased, the V-ribbed belt for which the rubber composition is used may have inferior crack durability.

On the other hand, for the V-ribbed belt B, by focusing on the ratio (M10 modulus/M50 modulus) of the M10 modulus to the M50 modulus and using a rubber composition in which this value is not less than 2.0, good wear durability is ensured without impairing crack durability.

The upper limit of M10 modulus/M50 modulus described above is usually about 5.0.

In the rubber composition forming the V-ribbed belt B, preferably, M10 modulus/M50 modulus is in the above range, and a stress at 50% elongation (M50) in the belt longitudinal direction (M50 in the longitudinal direction) is also not greater than 10 MPa.

When increasing M10 modulus/M50 modulus in order to achieve both good wear durability and good crack durability of the V-ribbed belt B, increasing the M10 modulus or decreasing the M50 modulus is conceivable, but in order to achieve both wear durability and crack durability at a high level, it is suitable to increase the M10 modulus while maintaining the M50 modulus.

The V-ribbed belt B that is trained around a pulley is pressed against the pulley and transmits power through frictional force. If the M10 modulus of the compression rubber layer 12 of the V-ribbed belt B is low, rib portions of the V-ribbed belt B enter deeply into the groove of the rib pulley during running, the rib bottom of the V-ribbed belt B is pressed against the rib pulley, and the contact surface pressure between the rib pulley and the rib bottom is increased.

On the other hand, the V-ribbed belt B in which the M10 modulus is increased can avoid an excessive increase in the contact surface pressure between the rib bottom and the rib pulley during running. In this case, when the M10 modulus is increased while maintaining the M50 modulus, good wear durability can be ensured while avoiding occurrence of cracks.

From such a viewpoint, in the V-ribbed belt B according to the present embodiment, the M50 in the longitudinal direction is preferably not greater than 10 MPa.

From the viewpoint of further improving wear durability and crack durability, the M50 in the longitudinal direction is more preferably not greater than 7 MPa.

The lower limit of the M50 in the longitudinal direction is not particularly limited, but is usually about 1.5 MPa.

In the rubber composition forming the V-ribbed belt B, a stress at 10% elongation (M10) in the belt longitudinal direction (hereinafter, also referred to as M10 in the longitudinal direction) is preferably not less than 2.0 MPa. This is because it is suitable for improving the wear durability of the V-ribbed belt B.

From the viewpoint of further improving wear durability, the M10 in the longitudinal direction of the rubber composition is more preferably not less than 2.5 MPa.

The upper limit of the M10 in the longitudinal direction is not particularly limited, but is usually about 7.0 MPa.

The tensile characteristics of the rubber composition forming the compression rubber layer 12 are evaluated under the measurement conditions conforming to JIS K6251 (2017), although the shape of a test piece is different. Specifically, the tensile characteristics are evaluated by the following method.

FIG. 2(*a*) to FIG. 2(*d*) illustrate a method for evaluating the tensile characteristics of the rubber composition forming the compression rubber layer 12.

First, from a V-ribbed belt 20 having a plurality of rib portions (see FIG. 2(*a*)), one rib portion 21 is cut out (see FIG. 2(*b*)). Then, a strip-shaped test piece 22 is cut out from the one rib portion 21 (see FIG. 2(*c*)). In this case, the test piece 22 is cut out, for example, from a shaded portion in FIG. 2(*a*).

The test piece 22 is a rectangular parallelepiped test piece having a thickness T of 0.5 to 1 mm, a height H of 1.5 to 2.0 mm, and a length L of 50 mm. The test piece 22 is cut out such that the longitudinal direction of the test piece 22 coincides with the longitudinal direction of the V-ribbed belt 20.

Next, a tensile test in which the test piece 22 is pulled in the longitudinal direction is performed, and a load at 10% elongation (MPa) and a load at 50% elongation (MPa) are measured.

In the tensile test, first, two reference lines 24 are marked on one of faces 23 (hereinafter, also referred to as main faces 23) having the maximum area of the test piece 22. The two reference lines 24 are marked at the center of the main face 23 of the test piece 22 such that the distance between the reference lines is 10 mm.

Next, the test piece 22 is attached to a tester, the tensile test is performed under the conditions of an experimental temperature of 23±2° C. and a tensile rate of 500 mm/min, and a load at 10% elongation and a load at 50% elongation are measured. Here, a tester capable of performing a tensile test such as a universal tester may be used as the tester.

Then, each of the measured load at 10% elongation and load at 50% elongation is divided by the cross-sectional area (thickness T×height H) of the test piece 22, and the obtained values are regarded as a stress at 10% elongation in the belt longitudinal direction (M10 in the longitudinal direction) and a stress at 50% elongation in the belt longitudinal direction (M50 in the longitudinal direction).

Furthermore, each of the M10 in the longitudinal direction and the M50 in the longitudinal direction is divided by the elongation amount (%) of each stress, and the obtained values are regarded as an M10 modulus and an M50 modulus, respectively.

Moreover, the ratio (M10 modulus/M50 modulus) of the M10 modulus to the M50 modulus is calculated.

The rubber composition forming the compression rubber layer 12 preferably has the following compression characteristics.

In the rubber composition forming the compression rubber layer 12, a stress M10 at 10% compression in the belt width direction of the V-ribbed belt B (hereinafter, also referred to as M10 in the width direction) is preferably not less than 2.0 MPa and more preferably not less than 3.0 MPa. Satisfying these requirements is further suitable for ensuring good wear durability of the V-ribbed belt B.

The upper limit of the M10 in the width direction is preferably 10.0 MPa. If the M10 in the width direction is excessively large, the flexibility in the longitudinal direction of the belt is impaired, and the belt may be broken at an early stage.

In the rubber composition forming the compression rubber layer 12, a stress M5 at 5% compression in the belt width direction of the V-ribbed belt B (hereinafter, also referred to as M5 in the width direction) is preferably not less than 1.2 MPa, more preferably not less than 1.4 MPa, further preferably not less than 1.6 MPa, and particularly preferably not less than 2.0 MPa. Satisfying these requirements is further suitable for ensuring good wear durability of the V-ribbed belt B.

The upper limit of the M5 in the width direction is preferably 7.0 MPa. If the M5 in the width direction is excessively large, the flexibility in the longitudinal direction of the belt is impaired, and the belt may be broken at an early stage.

The compression characteristics of the rubber composition forming the compression rubber layer 12 are evaluated by the following method. FIG. 2(*e*) illustrates a method for evaluating the compression characteristics of the rubber composition forming the compression rubber layer 12.

First, a test piece for evaluation is prepared. This test piece is prepared in the same manner as the test piece 22 for evaluating the tensile characteristics described above, but is a rectangular parallelepiped test piece 122 having a length L of 1.9 to 2.0 mm (see FIG. 2(*e*)). It is not necessary to provide any reference line on the test piece 122.

Next, a compression test in which the test piece 122 is compressed in the thickness direction is performed, and a load at 5% compression (MPa) and a load at 10% compression (MPa) are measured.

In the compression test, the test piece 122 is attached to a tester, the compression test is performed under the conditions of an experimental temperature of 23±2° C. and a compression rate of 1 mm/min, and a load at 5% compression and a load at 10% compression are measured. Here, a tester capable of performing a compression test such as a universal tester may be used as the tester.

Then, each of the measured load at 5% compression and load at 10% compression is divided by the cross-sectional area (height H×length L) of a face 123, of the test piece 122, which is pressed during compression, and the obtained values are regarded as a stress at 5% compression (M5 in the width direction) and a stress at 10% compression (M10 in the width direction).

The compression rubber layer 12 is formed by using an uncrosslinked rubber composition (raw material composition) in which various compounding ingredients are blended in a raw material rubber component.

Examples of the raw material rubber component of the rubber composition forming the compression rubber layer 12 include ethylene-α-olefin elastomers, such as ethylene propylene rubber (EPR) and ethylene-propylene-diene monomer rubber (EPDM), chloroprene rubber (CR), chlorosulfonated polyethylene rubber (CSM), and hydrogenated acrylonitrile rubber (HNBR). Among these rubbers, an ethylene-α-olefin elastomer is preferable from the viewpoint of exhibiting excellent properties in terms of heat resistance and cold resistance.

Examples of compounding ingredients used for the compression rubber layer 12 include a crosslinking agent such as sulfur and an organic peroxide, a vulcanization accelerator, a co-crosslinking agent, an antioxidant, a processing aid, a plasticizer, a reinforcing material such as carbon black, a filler, and short fibers. The rubber composition forming the compression rubber layer 12 is obtained by blending the compounding ingredients into the raw material rubber component and heating and pressurizing a kneaded uncrosslinked rubber composition to crosslink the rubber composition with a crosslinking agent.

The raw material composition for forming the compression rubber layer 12 preferably contains an unsaturated carboxylic acid metal salt as a compounding ingredient.

The blending amount of the unsaturated carboxylic acid metal salt is preferably 5 to 40 parts by mass per 100 parts by mass of the raw material rubber component. This is suitable for setting M10 modulus/M50 modulus in the rubber composition forming the compression rubber layer 12 to be not less than 1.5.

The unsaturated carboxylic acid metal salt is composed of an unsaturated carboxylic acid and a metal. Examples of the unsaturated carboxylic acid include unsaturated monocarboxylic acids such as acrylic acid and methacrylic acid, unsaturated dicarboxylic acids such as maleic acid, fumaric acid, and itaconic acid, monomethyl maleate, and monoethyl itaconate.

The metal is not particularly limited as long as the metal forms a salt together with an unsaturated carboxylic acid, and beryllium, magnesium, calcium, strontium, barium, titanium, chromium, molybdenum, manganese, iron, cobalt, nickel, copper, silver, zinc, cadmium, aluminum, tin, lead, mercury, antimony, or the like can be used.

Among these, zinc diacrylate or zinc dimethacrylate is preferable.

The uncrosslinked rubber composition for forming the compression rubber layer 12 preferably contains at least an ethylene-α-olefin elastomer as a raw material rubber material, a crosslinking agent, carbon black, and an unsaturated carboxylic acid metal salt. The uncrosslinked rubber composition containing such ingredients is particularly suitable for forming a rubber composition in which M10 modulus/M50 modulus described above is not less than 1.5.

In this case, at least sulfur is preferably contained as the crosslinking agent, and the blending amount of the sulfur is preferably 1 to 5 parts by mass per 100 parts by mass of the raw material rubber component.

The adhesive rubber layer 11 and the compression rubber layer 12 may be formed from different rubber compositions or may be formed from exactly the same rubber composition.

The backface rubber layer 17 is formed by using a raw material composition containing the same raw material rubber component and compounding ingredients as those for the adhesive rubber layer 11. From the viewpoint of suppressing occurrence of adhesion due to contact between the belt backface and a flat pulley, the backface rubber layer 17 is preferably formed from a rubber composition slightly harder than that of the adhesive rubber layer 11.

Moreover, the thickness of the backface rubber layer 17 is, for example, 0.4 mm to 0.8 mm. From the viewpoint of reducing noise generated between the belt backface and a flat pulley with which the belt backface is in contact, the grain of a woven fabric may be transferred to the surface of the backface rubber layer 17.

Instead of the backface rubber layer 17, a backface-side reinforcing fabric may be used. In this case, for example, the backface-side reinforcing fabric is formed from a fabric material, a knitted fabric, a non-woven fabric, or the like, using yarns made of cotton, polyamide fibers, polyester fibers, aramid fibers, or the like. The fabric material is, for example, plain-woven, twilled, or sateen-woven. In order to provide an adhesive property with respect to the belt body 10, the backface-side reinforcing fabric is subjected to an adhesion treatment of immersing the backface-side reinforcing fabric in an RFL aqueous solution and heating the backface-side reinforcing fabric before molding processing and/or an adhesion treatment of coating the surface on the belt body 10 side of the backface-side reinforcing fabric with rubber cement and drying the surface.

The rib-side reinforcing fabric 14 is, for example, a fabric knitted using wooly-finished yarns made of polyamide fibers, polyester fibers, cotton, nylon fibers, or the like which are subjected to false twist processing (woolly processing), or using covered yarns in each of which a polyurethane elastic yarn serving as a core yarn is covered with a covering yarn.

A fiber surface of the rib-side reinforcing fabric 14 may be coated with an RFL layer. The RFL coat may contain a friction coefficient reducing agent dispersed therein. Examples of the friction coefficient reducing agent include polytetrafluoroethylene (PTFE), a tetrafluoroethylene-ethylene copolymer (ETFE), and a tetrafluoroethylene-perfluoroalkyl vinyl ether copolymer (PFA). Among these agents, particles of polytetrafluoroethylene, which has the highest effect of reducing a friction coefficient, are preferably contained as the friction coefficient reducing agent.

If the surface of the rib-side reinforcing fabric 14 is covered with the RFL coat containing the friction coefficient reducing agent, even when the V-ribbed belt B is used in an environment where dust and rust are generated, dust and rust do not adhere to the inside of the rib-side reinforcing fabric 14, and the friction coefficient can be kept low.

The thickness of the rib-side reinforcing fabric 14 is, for example, 0.2 to 1.0 mm.

Figure 3:
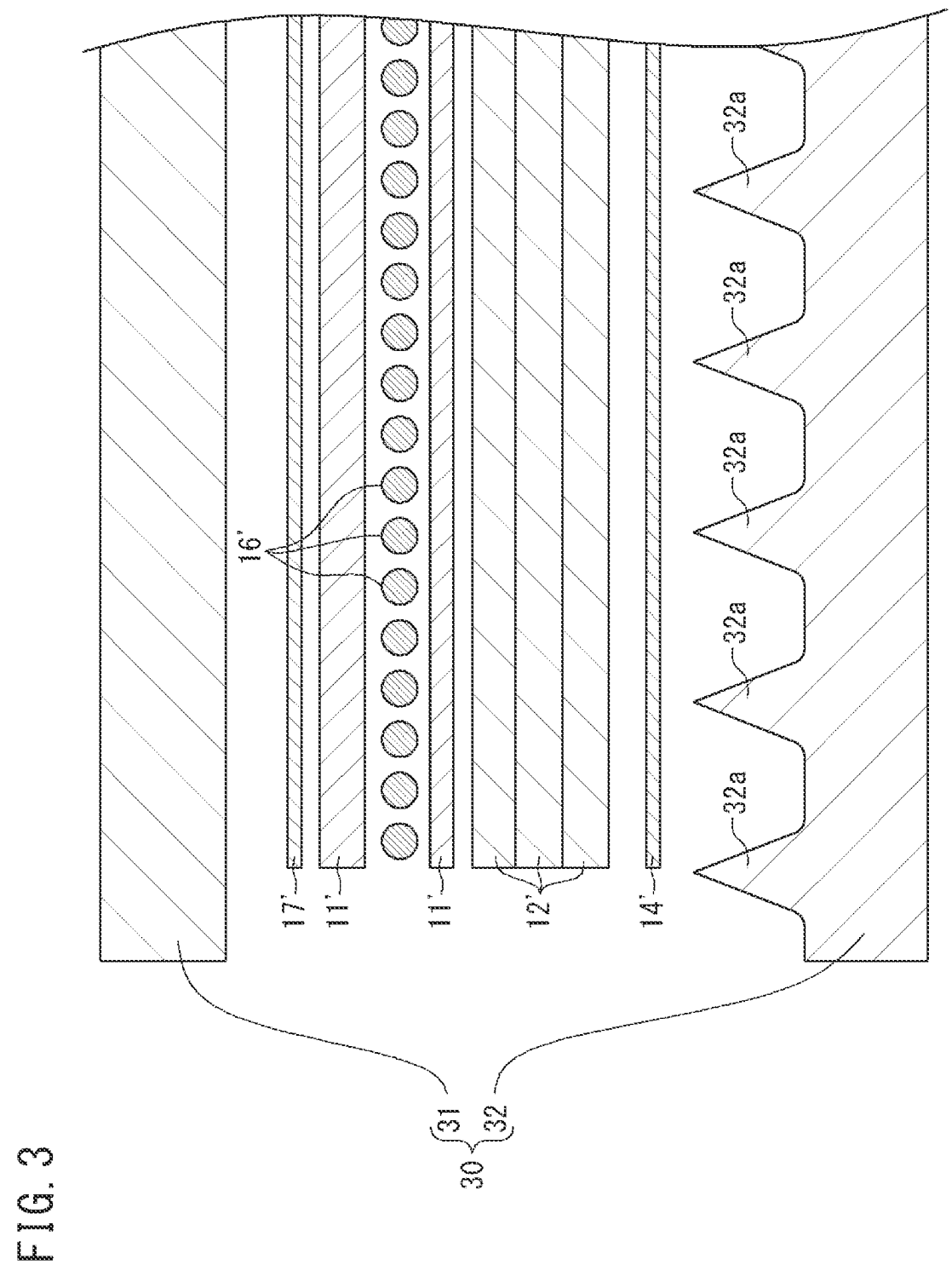
FIG. 3 illustrates a method for manufacturing the V-ribbed belt.
Figure 4:
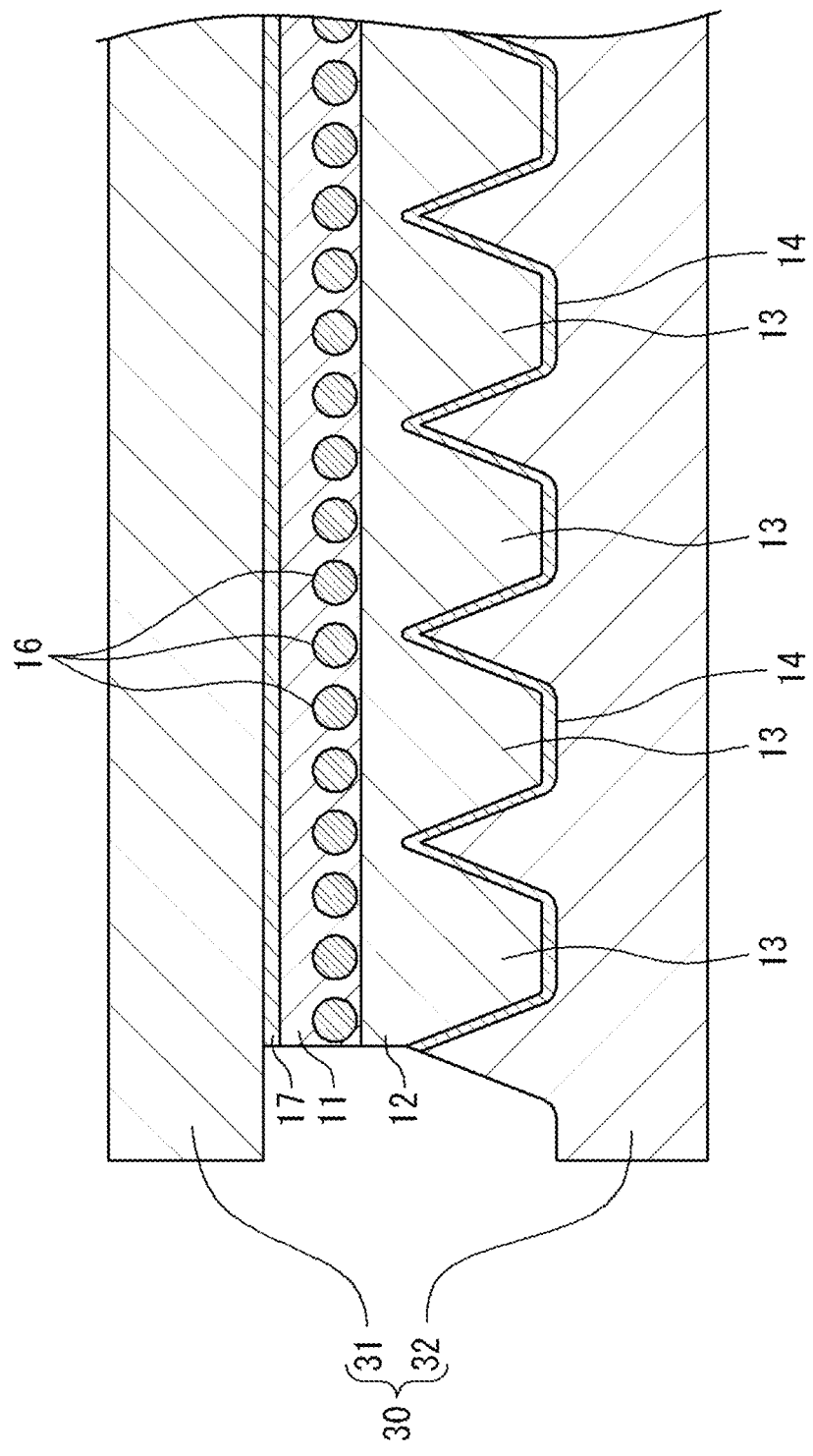
FIG. 4 illustrates a method for manufacturing the V-ribbed belt.

Next, a method for manufacturing the V-ribbed belt B will be described with reference to FIG. 3 and FIG. 4.

In the method for manufacturing the V-ribbed belt B, a belt forming apparatus 30 is used.

The belt forming apparatus 30 includes a cylindrical rubber sleeve mold 31 and a cylindrical outer mold 32 into which the rubber sleeve mold 31 is fitted.

The rubber sleeve mold 31 is made of, for example, acrylic rubber and has flexibility. By a method such as sending high-temperature steam from inside of the cylinder, the rubber sleeve mold 31 can be inflated radially outward and pressed against the cylindrical outer mold 32. The outer circumferential surface of the rubber sleeve mold 31 has, for example, a shape for forming a surface, which is to be the backface side of the V-ribbed belt B, into a smooth surface.

The rubber sleeve mold 31 has, for example, an outer diameter of 700 to 2,800 mm, a thickness of 8 to 20 mm, and a height of 500 to 1,000 mm.

The cylindrical outer mold 32 is made of, for example, metal. The inner surface of the cylindrical outer mold 32 is provided with ridge portions 32a for forming the V-shaped ribs 13 of the V-ribbed belt B, and the ridge portions 32a each have a substantially triangular cross-section and are provided so as to extend in the circumferential direction and be aligned in the height direction. For example, 140 ridge portions 32a are provided so as to be aligned in the height direction. The cylindrical outer mold 32 has, for example, an outer diameter of 830 to 2,930 mm, an inner diameter (not including the ridge portions 32a) of 730 to 2,830 mm, and a height of 500 to 1,000 mm. Each ridge portion 32a has a height of 2.0 to 2.5 mm and a width of 3.5 to 3.6 mm.

In the method for manufacturing the V-ribbed belt B, first, belt materials, that is, an adhesive rubber material 11', a compression rubber material 12', and a backface rubber material 17', which are uncrosslinked rubber sheets for forming the adhesive rubber layer 11, the compression rubber layer 12, and the backface rubber layer 17, respectively, a knitted fabric 14' for forming the rib-side reinforcing fabric 14, and the twisted yarn 16', which is to be the core wire 16, are prepared.

For the adhesive rubber material 11', a clumpy uncrosslinked rubber composition is obtained by kneading the raw material rubber and the compounding ingredients of the adhesive rubber layer 11 with a kneader, and the adhesive rubber material 11' is produced by processing the uncrosslinked rubber composition, for example, into a sheet having a thickness of 0.4 to 0.8 mm using a calendar roll.

For the compression rubber material 12', a clumpy uncrosslinked rubber composition is obtained by kneading the raw material rubber and the compounding ingredients of the compression rubber layer 12 with a kneader, and the compression rubber material 12' is produced by processing the uncrosslinked rubber composition, for example, into a sheet having a thickness of 0.6 to 1.0 mm using a calendar roll.

For the backface rubber material 17', a clumpy uncrosslinked rubber composition is obtained by kneading the raw material rubber and the compounding ingredients of the backface rubber layer 17 with a kneader, and the backface rubber material 17' is produced by processing the uncrosslinked rubber composition, for example, into a sheet having a thickness of 0.4 to 0.8 mm using a calendar roll.

As the knitted fabric 14' for forming the rib-side reinforcing fabric 14, a fabric obtained by performing an adhesion treatment of impregnating the knitted fabric 14' with an RFL aqueous solution and then heating the knitted fabric 14' and a treatment of applying rubber cement to one surface of the knitted fabric 14' to provide a rubber cement layer, is used.

The RFL aqueous solution for treating the knitted fabric 14' is a mixed liquid obtained by mixing latex with the initial condensate of resorcin and formalin. The solid content of the RFL aqueous solution is, for example, 10 to 30% by mass. The molar ratio of resorcin (R) to formalin (F) is, for example, R/F=1/1 to 1/2. Examples of the latex include ethylene-propylene-diene monomer rubber latex (EPDM), ethylene-propylene rubber latex (EPR), chloroprene rubber latex (CR), chlorosulfonated polyethylene rubber latex (CSM), and hydrogenated acrylonitrile rubber latex (X-NBR). The mass ratio of the initial condensate (RF) of resorcin and formalin to latex (L) is, for example, RF/L=1/5 to 1/20. A friction coefficient reducing agent such as polytetrafluoroethylene (PTFE) is contained in this RFL aqueous solution, for example, in an amount of 10 to 50 parts by mass per 100 parts by mass of the RFL solid content.

After the knitted fabric 14' is immersed in this RFL aqueous solution, the knitted fabric 14' is heated and dried at 120 to 170° C. using a drying furnace, whereby the moisture of the RFL aqueous solution scatters and the condensation reaction between resorcin and formalin proceeds to form an RFL layer so as to cover the surface of the knitted fabric 14'. The amount of the attached RFL layer is, for example, 5 to 30 parts by mass per 100 parts by mass of the knitted fabric 14'.

When the knitted fabric 14' subjected to such treatments is formed into a cylindrical shape by a known method, the knitted fabric 14' can easily be set to the rubber sleeve mold 31.

Next, the belt materials are sequentially set to the rubber sleeve mold 31. The sheet-shaped backface rubber material 17' is wrapped around the rubber sleeve mold 31. Then, the sheet-shaped adhesive rubber material 11' is wrapped over the backface rubber material 17', and the twisted yarn 16' is also wound several times over the adhesive rubber material 11' so as to extend in the circumferential direction. At this time, the twisted yarn 16' is wound to form a helical pattern having a pitch in the height direction of the rubber sleeve mold 31. Next, the sheet-shaped adhesive rubber material 11' is wrapped over the twisted yarn 16', and the sheet-shaped compression rubber material 12' is further wrapped over the adhesive rubber material 11'. Then, the tubular knitted fabric 14' is fitted over the compression rubber material 12'. At this time, as shown in FIG. 3, the backface rubber material 17', the adhesive rubber material 11', the twisted yarn 16', the adhesive rubber material 11', the compression rubber material 12', and the knitted fabric 14' are stacked in this order from the rubber sleeve mold 31. Then, the cylindrical outer mold 32 is mounted outward of these belt materials.

Subsequently, in a state where the cylindrical outer mold 32 is mounted on the rubber sleeve mold 31, for example, high-temperature steam is sent into the rubber sleeve mold 31 to apply heat and pressure to the rubber sleeve mold 31, whereby the rubber sleeve mold 31 is inflated and pressed against the cylindrical outer mold 32, and the belt materials are sandwiched between the rubber sleeve mold 31 and the cylindrical outer mold 32. At this time, for example, the belt materials have a temperature of 150 to 180° C., and receive a pressure of 0.5 to 1.0 MPa in the radially outward direction. Thus, as the rubber component flows, a crosslinking reaction proceeds, and the adhesion reaction of the knitted fabric 14' and the twisted yarn 16' to the rubber component also proceeds. Furthermore, V-shaped grooves between the V-shaped ribs 13 are formed by the ridge portions 32a on the inner surface of the cylindrical outer mold 32, which are the portions for forming the V-shaped ribs 13. In this manner, a V-ribbed belt slab (belt body precursor) is formed.

Finally, the V-ribbed belt slab is cooled and removed from the belt forming apparatus 30. Then, the removed V-ribbed belt slab is cut in round slices each having a width of 10.68 to 28.48 mm, for example, and each round slice is turned inside out. As a result, the V-ribbed belt B is obtained.

According to the above manufacturing method, the crosslinking reaction of the uncrosslinked rubber component of the V-ribbed belt B, the adhesion reaction between the rubber component and the fiber component, and the molding of the V-shaped ribs 13 can be performed at the same time, so that the manufacture can be easy.

In the present embodiment, the knitted fabric 14' made into a cylindrical shape is fitted and set to the rubber sleeve mold 31, but the knitted fabric 14' subjected to a predetermined adhesion treatment may be wrapped around the rubber sleeve mold 31 while being maintained in the form of a sheet.

In addition, the sheet-shaped backface rubber material 17', the sheet-shaped adhesive rubber material 11', and the sheet-shaped compression rubber material 12' are wrapped and set to the rubber sleeve mold 31, but these materials may be formed into a cylindrical shape in advance, and fitted and set to the rubber sleeve mold 31.

Moreover, the belt forming apparatus 30 has been described as one in which the V-shaped grooves for forming the V-shaped ribs 13 of the V-ribbed belt B are provided on the inner surface of the cylindrical outer mold 32, but is not particularly limited thereto. For example, ridge portions for forming the V-shaped ribs 13 of the V-ribbed belt B may be provided on the outer circumferential surface of the rubber sleeve mold 31, and the inner circumferential surface of the cylindrical outer mold 32 may be formed to be smooth for forming the back surface of the V-ribbed belt B. In this case, the knitted fabric 14', the compression rubber material 12', the adhesive rubber material 11', the twisted yarn 16', the adhesive rubber material 11', and the back face rubber material 17' are wrapped over the rubber sleeve mold 31 in this order.

Although the embodiment of the V-ribbed belt has been described above as the friction transmission belt according to the embodiment of the present invention, the friction transmission belt according to the embodiment of the present invention is not limited thereto, and may be a V-belt or the like.

EXAMPLES

Hereinafter, the present invention will be more specifically described by means of examples, but the present invention is not limited to the examples below.

V-ribbed belts of Examples 1 to 4 and Comparative Examples 1 and 2 were produced and evaluated.

The raw materials and blending formula of the adhesive rubber layer are also shown in Table 1. The raw materials, the blending formula, and the evaluation results of the compression rubber layer are shown in Table 2.
(Evaluation Belt)
<Adhesive Rubber Material>

As an adhesive rubber material for forming an adhesive rubber layer, an unvulcanized rubber composition was prepared by using EPDM (manufactured by JSR Corporation, trade name: JSR EP123) as a raw material rubber, and blending and kneading, per 100 parts by mass of the raw material rubber, 50 parts by mass of carbon black (manufactured by Asahi Carbon Co., Ltd., trade name: Asahi #60), 8 parts by mass of a plasticizer (manufactured by JAPAN SUN OIL COMPANY, LTD., trade name: Sunflex 2280), 1 part by mass of stearic acid (manufactured by Kao Corporation, trade name: Stearic Acid), 5 parts by mass of zinc oxide (manufactured by Sakai Chemical Industry Co., Ltd., trade name: Zinc Oxide Type 2), 30 parts by mass of zinc methacrylate (manufactured by Kawaguchi Chemical Industry Co., Ltd., trade name: ACTOR ZMA), 1 part by mass of a vulcanization accelerator (1) (manufactured by OUCHI SHINKO CHEMICAL INDUSTRIAL CO., LTD., trade name: NOCCELER MSA-G), 3 parts by mass of a vulcanization accelerator (2) (manufactured by SANSHIN CHEMICAL INDUSTRY CO., LTD., trade name: SANCELER EM-2), and 1.5 parts by mass of sulfur (manufactured by Hosoi Chemical Industry Co., Ltd., Oil Sulfur). This unvulcanized rubber composition was processed into a sheet having a thickness of 0.45 mm, using a roll. The blending formula of the adhesive rubber material is also shown in Table 1.

TABLE 1

| | Manufacturer | Trade name | Adhesive rubber layer |
|---|---|---|---|
| EPDM | JSR Corporation | JSR EP123 | 100 |
| Carbon black | Asahi Carbon Co., Ltd. | Asahi #60 | 50 |
| Plasticizer | JAPAN SUN OIL COMPANY, LTD. | Sunflex 2280 | 8 |
| Stearic acid | Kao Corporation | Stearic Acid | 1 |
| Zinc oxide | Sakai Chemical Industry Co., Ltd. | Zinc Oxide Type 2 | 5 |
| Zinc methacrylate | Kawaguchi Chemical Industry Co., Ltd. | ACTOR ZMA | 30 |
| Vulcanization accelerator (1) | OUCHI SHINKO CHEMICAL INDUSTRIAL CO., LTD. | NOCCELER MSA-G | 1 |
| Vulcanization accelerator (2) | SANSHIN CHEMICAL INDUSTRY CO., LTD. | SANCELER EM-2 | 3 |
| Sulfur | Hosoi Chemical Industry Co., Ltd. | Oil Sulfur | 1.5 |

<Compression Rubber Material>

As a compression rubber material for forming a compression rubber layer, an unvulcanized rubber composition was prepared by blending and kneading the same compounding raw materials as those of the adhesive rubber material in the blending amounts shown in Table 2. This unvulcanized rubber composition was processed into a sheet having a thickness of 0.7 mm, using a roll.

TABLE 2

| | | Example 1 | Example 2 | Example 3 | Example 4 | Comparative Example 1 | Comparative Example 2 |
|---|---|---|---|---|---|---|---|
| Blending formula of compression rubber layer | EPDM | 100 | 100 | 100 | 100 | 100 | 100 |
| | Carbon black | 65 | 75 | 85 | 95 | 80 | 100 |
| | Plasticizer | 8 | 8 | 8 | 8 | 8 | 8 |
| | Stearic acid | 1 | 1 | 1 | 1 | 1 | 1 |
| | Zinc oxide | 5 | 5 | 5 | 5 | 5 | 5 |
| | Zinc methacrylate | 30 | 20 | 10 | 5 | 0 | 0 |
| | Vulcanization accelerator (1) | 1 | 1 | 1 | 1 | 1 | 1 |
| | Vulcanization accelerator (2) | 3 | 3 | 3 | 3 | 3 | 3 |
| | Sulfur | 1.5 | 1.5 | 1.5 | 1.5 | 1.5 | 1.5 |

<Backface Rubber Material>

A sheet formed from an uncrosslinked rubber composition for forming a backface rubber layer was prepared in the same manner as in the production of the compression rubber material.
<Twisted Yarn>

As a twisted yarn for forming a core wire, a twisted yarn made of polyester fibers was prepared, immersed in an RFL aqueous solution, and then heated and dried.
<Knitted Fabric>

The knitted fabric used is a flat knitted (jersey stitch) fabric using a yarn in which a urethane elastic yarn is covered with a 6-nylon yarn. The urethane elastic yarn has a fineness of 22 denier (24.4 dtex). The 6-nylon yarn has a fineness of 78 denier (86.7 dtex), and the number of filaments thereof is 52. In addition, the knitted fabric has a knit density of 66 wales per 2.54 cm and 70 courses per 2.54 cm. The knitted fabric has a thickness of 0.52 mm.

A PTFE-containing RFL aqueous solution for performing an RFL adhesion treatment on such a knitted fabric was prepared. Specifically, resorcin (R) and formalin (F) were mixed, a sodium hydroxide aqueous solution was added thereto, and the mixture was stirred to obtain an RF initial condensate (molar ratio R/F=1/1.5). Then, VP latex (L) was mixed into the RF initial condensate such that the mass ratio RF/L became 1/8. Water was further added to the mixture such that the mixture was adjusted to have a solid content concentration of 20%. Then, 30 parts by mass of PTFE (manufactured by AGC Inc., trade name: Fluon PTFE AD911, PTFE average particle diameter: 0.25 µm, containing 60% by mass of PTFE) was further blended per 100 parts by mass of the RFL solid content, and the mixture was stirred for 24 hours to prepare a PTFE-containing RFL aqueous solution. The knitted fabric was immersed in the PTFE-containing RFL aqueous solution, and then heated and dried, whereby an RFL coat was formed on the surface of the knitted fabric.

Subsequently, the ends (joint portions) of the knitted fabric subjected to the RFL adhesion treatment were thermocompression-bonded with ultrasonic vibrations (vibration frequency of approximately 80 kHz) applied, thereby forming the knitted fabric into a tubular shape.

Example 1

A V-ribbed belt was produced using the belt forming apparatus 30 including the rubber sleeve mold 31 for molding the backface of a belt into a predetermined shape and the cylindrical outer mold 32 for molding the inner side of the belt into a predetermined shape. The cylindrical outer mold 32 had the ridge portions 32a, for forming V-shaped ribs on a belt, provided in the circumferential direction on the inner side of the cylindrical outer mold 32.

First, as materials for forming the V-ribbed belt, an adhesive rubber material, a compression rubber material, a backface rubber material, a knitted fabric, and a twisted yarn were prepared as described above.

The uncrosslinked rubber material for forming the backface rubber layer 17, the uncrosslinked rubber material for forming the adhesive rubber layer, and the twisted yarn were wrapped around the rubber sleeve mold 31 of the belt forming apparatus 30 in this order. Next, the uncrosslinked rubber material for forming the adhesive rubber layer and the uncrosslinked rubber material for forming the compression rubber layer were wrapped thereon. Thereafter, the tubular knitted fabric subjected to the above adhesion treatment was fitted thereon.

Next, the cylindrical outer mold 32 provided with the V-shaped grooves was fitted to the rubber sleeve mold 31 over the belt materials. Then, the rubber sleeve mold 31 was inflated and pressed against the cylindrical outer mold 32, and simultaneously, the rubber sleeve mold 31 was heated with high-temperature steam or the like. At this time, as the rubber component flowed, the crosslinking reaction proceeded, and in addition, the adhesion reaction of the twisted yarn and the knitted fabric to the rubber also proceeded. As a result, a tubular belt precursor was obtained.

Finally, this belt precursor was removed from the belt forming apparatus 30, was longitudinally cut along the width thereof so as to have a width of 10.68 mm (3 PK: three ribs), and was turned inside out, whereby a V-ribbed belt was obtained. The circumference of the belt was 1,210 mm.

Examples 2-4 and Comparative Examples 1 and 2

V-ribbed belts each having a width of 10.68 mm (3 PK: three ribs) and a circumference of 1,210 mm were obtained in the same manner as in Example 1, except that the compression rubber material was changed (see Table 2).

The following physical property evaluation and performance evaluation were performed on the V-ribbed belts produced in Examples and Comparative Examples. The results are shown in Table 3.

(Physical Property Evaluation)

For each of the V-ribbed belts produced in Examples and Comparative Examples, using the method already described for the compression rubber layer of the V-ribbed belt, a rectangular parallelepiped evaluation sample (test piece) 22 having a thickness T of 0.5 to 1 mm, a height H of 1.9 to 2.0 mm, and a length L of 50 mm was cut out.

Two reference lines 24 were marked on one of the main faces 23 of this test piece 22. The distance between the reference lines was set to 10 mm.

A tensile test in which the test piece 22 was pulled in the longitudinal direction was performed, and a load at 10% elongation (MPa) and a load at 50% elongation (MPa) were measured (see FIG. 2(a) to FIG. 2(d)).

Here, a universal tester (Instron 5969 type) was used as a tester, and measurement was performed under measurement conditions (experimental temperature: 23±2° C., tensile rate: 500 mm/min) conforming to JIS K6251: 2017. The distance between chucks when both ends of the test piece 22 were grasped was set to 30 mm. The number of test pieces evaluated was five.

Each of the measured load at 10% elongation and load at 50% elongation was divided by the cross-sectional area (thickness T×height H) of the test piece 22, and the obtained values were regarded as a stress at 10% elongation (M10 in the longitudinal direction) and a stress at 50% elongation (M50 in the longitudinal direction).

Furthermore, each of the stress at 10% elongation (M10 in the longitudinal direction) and the stress at 50% elongation (M50 in the longitudinal direction) was divided by the elongation amount (%) of each stress, and the obtained values were regarded as an M10 modulus and an M50 modulus, respectively. Moreover, the ratio (M10 modulus/M50 modulus) of the M10 modulus to the M50 modulus was calculated.

"M50 in the longitudinal direction", "M10 modulus", "M50 modulus", and "M10 modulus/M50 modulus" are shown in Table 3.

(Performance Evaluation)
<Wear Resistance Evaluation>

Figure 5:
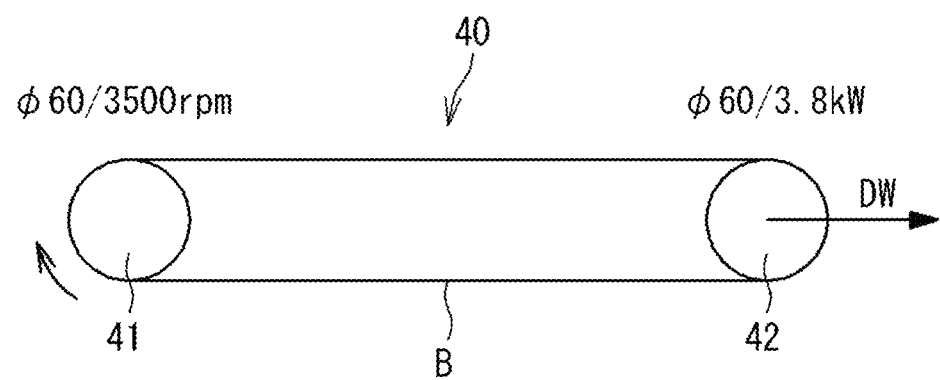
FIG. 5 illustrates a layout of pulleys of a belt durability tester in a wear durability test.

FIG. 5 shows a layout of pulleys of a belt durability tester 40 for evaluating the wear durability of a V-ribbed belt.

The belt durability tester 40 includes a pair of a driving rib pulley 41 and a driven rib pulley 42 arranged horizontally and each having a pulley diameter of 60 mm.

First, an initial belt mass (belt mass before a running test) was measured for each of the V-ribbed belts produced in Examples and Comparative Examples. Next, the V-ribbed belt B was trained around the driving rib pulley 41 and the driven rib pulley 42 such that the V-shaped rib side thereof was in contact with the pulleys. The driving rib pulley 41 was pulled sideways such that a dead weight (DW) of 1,177 N (120 kgf) was applied to the driving rib pulley 41, and simultaneously, a rotational load of 3.8 kW (5.2 PS) was applied to the driven rib pulley 42.

A belt running test in which the driving rib pulley 41 was rotated at a rotation speed of 3,500 rpm for 96 hours was performed in a room temperature environment (23±5° C.), and then the mass of the V-ribbed belt B after running was measured.

A mass reduction rate was calculated from the measured mass on the basis of the following formula (1), and used as an evaluation index for wear durability.

Mass reduction rate (% by mass)=[(initial mass−mass after running)/initial mass]×100     (1)

In this evaluation, a belt with a mass reduction rate of 1.6% by mass or less was determined as "AA", a belt with a mass reduction rate of 2.0% by mass or less was determined as "A", a belt with a mass reduction rate of 2.4% by mass or less was determined as "B", and a belt with a mass reduction rate exceeding 2.4% by mass was determined as "C".

<Crack Durability Evaluation>

Figure 6:
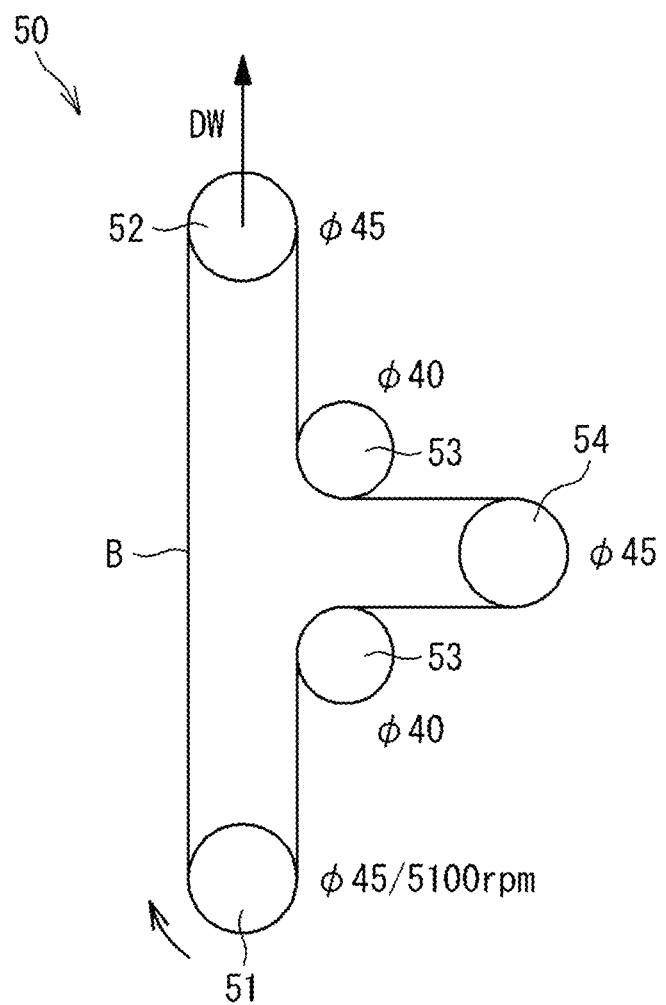
FIG. 6 illustrates a layout of pulleys of a belt durability tester in a crack durability test.

FIG. 6 shows a layout of pulleys of a belt durability tester 50 for evaluating the crack durability of a V-ribbed belt.

The belt durability tester 50 for crack durability evaluation is provided with a driving rib pulley 51 and a first driven rib pulley 52 each of which is a rib pulley having a pulley diameter of 45 mm and which are arranged vertically at an interval (the lower side is the driving rib pulley 51, and the upper side is the first driven rib pulley 52). A pair of idler pulleys 53 which are flat pulleys each having a pulley diameter of 40 mm are provided vertically at an interval on the right side of the vicinity of the middle in the vertical direction between the driving rib pulley 51 and the first driven rib pulley 52. A second driven rib pulley 54 which is a rib pulley having a pulley diameter of 45 mm is provided to the right of the pair of idler pulleys 53.

The belt durability tester 50 for crack durability evaluation is configured such that the V-ribbed belt B is trained around the pulleys of the belt durability tester 50 such that the V-shaped rib side thereof is in contact with the driving rib pulley 51 and the first and second driven rib pulleys 52 and 54 and the backface side thereof is in contact with the pair of idler pulleys 53.

Each of the V-ribbed belts produced in Examples and Comparative Examples was set to the above-described belt durability tester 50 for crack durability evaluation. A dead weight (DW) of 588 N (60 kgf) was applied upward to the first driven rib pulley 52 such that belt tension was applied, and the driving rib pulley 51 was rotated at a rotation speed of 5,100 rpm under a no-load condition to run the belt. The belt running was performed in a room temperature environment (23±5° C.).

In this evaluation, the belt running was stopped periodically, the presence or absence of cracks to the rib bottom of the V-ribbed belt B was observed, and the time until cracks to the rib bottom occurred at three points was measured. This time was defined as a crack occurrence time, and the belt running was terminated when cracks to the rib bottom occurred at three points.

In this evaluation, a belt with a crack occurrence time exceeding 200 hours was determined as "AA", a belt with a crack occurrence time exceeding 100 hours was determined as "A", a belt with a crack occurrence time exceeding 50 hours was determined as "B", and a belt with a crack occurrence time of 50 hours or shorter was determined as "C".

TABLE 3

| | | | Example 1 | Example 2 | Example 3 | Example 4 | Comparative Example 1 | Comparative Example 2 |
|---|---|---|---|---|---|---|---|---|
| Physical property evaluation of compression rubber layer | | M10 modulus (MPa/%) | 0.42 | 0.31 | 0.28 | 0.31 | 0.17 | 0.25 |
| | | M50 modulus (MPa/%) | 0.13 | 0.13 | 0.14 | 0.17 | 0.12 | 0.17 |
| | | M10 modulus/M50 modulus | 3.28 | 2.35 | 2.06 | 1.87 | 1.47 | 1.48 |
| | | M50 in the longitudinal direction (MPa) | 6.40 | 6.60 | 6.80 | 8.30 | 5.80 | 8.45 |
| Performance evaluation | Wear resistance | Mass reduction rate (% by mass) | 0.98 | 1.14 | 1.22 | 1.09 | 2.91 | 1.74 |
| | | Determination | AA | AA | AA | AA | C | A |
| | Crack durability | Crack occurrence time (h) | 520 | 380 | 340 | 98 | 350 | 48 |
| | | Determination | AA | AA | AA | B | AA | C |

As shown in Table 3, the V-ribbed belt according to the embodiment of the present invention can ensure good wear durability. Furthermore, good crack durability can also be achieved by increasing M10 modulus/M50 modulus.

INDUSTRIAL APPLICABILITY

The friction transmission belt according to the present disclosure is useful, for example, for an auxiliary mechanism driving belt transmission device of an automobile, and the like.

REFERENCE SIGNS LIST 10 belt body
11 adhesive rubber layer
11' adhesive rubber material
12 compression rubber layer
12' compression rubber material
13 V-shaped rib
14 rib-side reinforcing fabric
14' knitted fabric
16 core wire
16' twisted yarn
17 backface rubber layer
17' backface rubber material
20, B V-ribbed belt
21 rib portion
22, 122 test piece
30 belt forming apparatus
31 rubber sleeve mold
32 cylindrical outer mold
32a ridge portion
40, 50 belt durability tester
41, 51 driving rib pulley
42 driven rib pulley
52 first driven rib pulley
53 pair of idler pulleys
54 second driven rib pulley

The invention claimed is:

1. A friction transmission belt comprising a compression layer forming a pulley contact portion,
   wherein the compression layer includes an inner layer formed from a rubber composition and an outer layer provided on a pulley contact side of the inner layer and formed from a fiber member,
   wherein a ratio of a modulus at 10% elongation in a belt longitudinal direction to a modulus at 50% elongation in the belt longitudinal direction, of the rubber composition, is not less than 2.0,
   wherein the rubber composition is a crosslinked product of an uncrosslinked rubber composition containing at least an ethylene-α-olefin elastomer, a crosslinking agent, carbon black, and an unsaturated carboxylic acid metal salt,
   wherein the blending amount of the unsaturated carboxylic acid metal salt is not less than 20 parts by mass and not greater than 40 parts by mass per 100 parts by mass of the ethylene-α-olefin elastomer, wherein the crosslinking agent comprises sulfur, and the blending amount of sulfur is not less than 1 parts by mass and not greater than 5 parts by mass per 100 parts by mass of the ethylene-α-olefin elastomer, and
   wherein the modulus at 10% elongation in the belt longitudinal direction is a value obtained by dividing, by an elongation amount, a stress at 10% elongation (M10) in the belt longitudinal direction as measured at 23±2° C. and a tensile rate of 500 mm/min, and the modulus at 50% elongation in the belt longitudinal direction is a value obtained by dividing, by an elongation amount, a stress at 50% elongation (M50) in the belt longitudinal direction as measured at 23±2° C. and a tensile rate of 500 mm/min.

2. The friction transmission belt according to claim 1, wherein the stress at 50% elongation (M50) in the belt longitudinal direction of the rubber composition is not greater than 10 MPa.

3. The friction transmission belt according to claim 2, wherein the stress at 50% elongation (M50) in the belt longitudinal direction is not greater than 7 MPa.

4. The friction transmission belt according to claim 1, wherein the friction transmission belt is a V-ribbed belt.

* * * * *